US009026337B2

(12) United States Patent
Wilms et al.

(10) Patent No.: US 9,026,337 B2
(45) Date of Patent: May 5, 2015

(54) METHOD AND DEVICE FOR CONTROLLING A QUANTITY CONTROL VALVE

(75) Inventors: Rainer Wilms, Markgroeningen (DE); Matthias Schumacher, Weissach (DE); Joerg Kuempel, Ludwigsburg (DE); Matthias Maess, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/508,807

(22) PCT Filed: Oct. 21, 2010

(86) PCT No.: PCT/EP2010/065873
§ 371 (c)(1), (2), (4) Date: Jul. 27, 2012

(87) PCT Pub. No.: WO2011/061038
PCT Pub. Date: May 26, 2011

(65) Prior Publication Data
US 2012/0283883 A1 Nov. 8, 2012

(30) Foreign Application Priority Data
Nov. 17, 2009 (DE) ......................... 10 2009 046 783

(51) Int. Cl.
*G06F 19/00* (2011.01)
*F02D 41/24* (2006.01)
(Continued)

(52) U.S. Cl.
CPC ............ *F02D 41/2464* (2013.01); *F02D 41/20* (2013.01); *F02D 41/2467* (2013.01); *F02D 41/248* (2013.01); *F02D 41/3845* (2013.01); *F02D 2041/2027* (2013.01); *F02D 2041/2051* (2013.01); *F02D 2041/2058* (2013.01);
(Continued)

(58) Field of Classification Search
CPC ......................... F02D 2200/0602; F02D 41/26
USPC ......................... 700/282; 123/188.1; 701/101
See application file for complete search history.

(56) References Cited

U.S. PATENT DOCUMENTS

2001/0003979 A1* 6/2001 Oki et al. ...................... 123/520
2004/0250794 A1* 12/2004 Wolber et al. ................ 123/446
(Continued)

FOREIGN PATENT DOCUMENTS

CN 1614216 5/2005
CN 1892012 1/2007
(Continued)

OTHER PUBLICATIONS

Schwab, M.; Braun, T.; Strausberger, F.; Reuter, J., "Nonlinear voltage control for motion state detection in solenoid valves: A Lyapunov approach," Methods and Models in Automation and Robotics (MMAR), 2014 19th International Conference On , vol., No., pp. 492,497, Sep. 2-5, 2014.*
(Continued)

*Primary Examiner* — Michael D Masinick
(74) *Attorney, Agent, or Firm* — Kenyon & Kenyon LLP

(57) ABSTRACT

In a method for controlling a quantity control valve, at least two parameters characterizing the quantity control valve are utilized. A control signal supplied to the quantity control valve is defined by the at least two parameters. At least one parameter is ascertained based on the result of a first adaptation and a second adaptation, or based on the result of a first adaptation and the other parameter.

13 Claims, 6 Drawing Sheets

(51) Int. Cl.

| | |
|---|---|
| *F02D 41/20* | (2006.01) |
| *F02D 41/38* | (2006.01) |
| *F02M 59/36* | (2006.01) |
| *F02M 63/02* | (2006.01) |

(52) U.S. Cl.
CPC ...... *F02D2200/0602* (2013.01); *F02M 59/366* (2013.01); *F02M 63/0225* (2013.01)

(56) References Cited

U.S. PATENT DOCUMENTS

| | | | | |
|---|---|---|---|---|
| 2005/0092301 | A1 | 5/2005 | Fukuda | |
| 2005/0128658 | A1* | 6/2005 | Frenz et al. | 361/18 |
| 2008/0010000 | A1* | 1/2008 | Casal Kulzer | 701/104 |
| 2009/0138175 | A1* | 5/2009 | Lenz et al. | 701/103 |
| 2010/0251809 | A1* | 10/2010 | Migueis et al. | 73/114.51 |
| 2011/0146799 | A1* | 6/2011 | Kiesbauer et al. | 137/1 |
| 2011/0288748 | A1* | 11/2011 | Richter et al. | 701/103 |

FOREIGN PATENT DOCUMENTS

| | | |
|---|---|---|
| DE | 10 2004 011 439 | 10/2004 |
| DE | 10 2004 049 812 | 4/2006 |
| DE | 10 2006 032 466 | 9/2007 |
| DE | 10 2007 035 316 | 1/2009 |
| DE | 10 2007 058 230 | 6/2009 |
| DE | 10 2008 054 512 | 6/2010 |
| DE | 10 2008 054 513 | 6/2010 |
| KR | 2007-0003029 | 1/2007 |

OTHER PUBLICATIONS

International Search Report for PCT/EP2010/065873, dated Feb. 17, 2011.

* cited by examiner

METHOD AND DEVICE FOR CONTROLLING A QUANTITY CONTROL VALVE

BACKGROUND OF THE INVENTION

1. Field of the Invention

The present invention relates to a device and a method for operating a quantity control valve e.g., for supplying fuel to a high-pressure pump, which quantity control valve is provided, for example, with a solenoid valve which is electromagnetically activatable by a coil.

2. Description of Related Art

A method is known from published German patent application document DE 10 2007 035 316 for controlling a quantity control valve having a solenoid valve which is electromagnetically activatable by a coil, in which the coil of the solenoid valve is energized with a first current value in order to close the solenoid valve for supplying fuel to the high-pressure pump, during closing of the solenoid valve the first current value being lowered to a second current value in such a way that emission of audible sound, generated during closing of the solenoid valve during operation of the internal combustion engine, is at least partially reduced.

A method is known from German patent application DE 10 2008 054 513, not pre-published, for controlling a quantity control valve which is influenced by an electromagnetic actuating device. A control signal supplied to the electromagnetic actuating device is defined by at least two parameters, in an adaptation process at least one first parameter of this control signal, with the second parameter fixed, being successively changed from a starting value to an end value at which, at least indirectly, closing or opening of the quantity control valve is no longer detected or is just detected, after which the first parameter is at least preliminarily fixed based on the end value, and the preliminarily fixed first parameter is adapted on the basis of at least one instantaneous operating variable of the fuel injection system, or the second parameter is adapted on the basis of at least one instantaneous operating variable of the fuel injection system and the preliminarily fixed first parameter.

These adaptation methods known from the related art vary the parameters of the control signal of the quantity control valve in such a way that the closing behavior of the quantity control valve is appropriately selected. A characterization of the behavior of the quantity control valve does not take place.

German patent application DE 10 2008 054 512, not pre-published, proposes that, for controlling a quantity control valve which is activated by an electromagnetic actuating device, at least one parameter of a braking pulse is a function of an efficiency of the electromagnetic actuating device and/or of a supply voltage of a voltage source, and/or of a temperature, in particular of a component of the fuel injection system or of the internal combustion engine. The following procedure is used to characterize the efficiency of the electromagnetic actuating device: In an adaptation process, energy supplied to the electromagnetic actuating device is successively changed from a starting value to an end value at which closing or opening of the quantity control valve is no longer detected, or is just detected. The end value or a variable based thereon is used for characterizing the efficiency of the electromagnetic actuating device.

The particularly accurate adaptation of the control of the quantity control valve to the specimen properties requires an accurate characterization of the specimen properties. Two or more parameters are often necessary for this characterization. However, two parameters are not independently ascertainable from only one measurement, as known in the related art.

BRIEF SUMMARY OF THE INVENTION

The present invention relates to a method for controlling a quantity control valve, at least two parameters characterizing the quantity control valve, a control signal supplied to the quantity control valve being defined by at least two parameters. The method according to the present invention allows in particular the independent ascertainment of two parameters which characterize the behavior of the quantity control valve.

For reducing the emission of audible sound during closing of the quantity control valve, it is particularly advantageous to suitably adapt the control of the quantity control valve to the specimen properties of the quantity control valve. The method according to the present invention for controlling a quantity control valve which is characterized by at least two parameters, a control signal supplied to the quantity control valve being defined by at least two parameters, and which is characterized in that at least one parameter is ascertained based on the result of a first adaptation and a second adaptation or a second parameter is ascertained based on the result of a first adaptation and a first parameter, allows the specimen properties to be ascertained. The properties of the quantity control valve vary from one specimen to another.

In the adaptation, if at least one first parameter is held at a first constant value, and at least one second parameter is changed from a first starting value to such an end value at which closing or opening of the quantity control valve is just no longer ascertained or is just ascertained, the end value allows ascertainment of the characterizing relationship between the control signal and the closing/opening behavior of the quantity control valve.

As the result of at least one third parameter being held at a second constant value in a second adaptation, and at least one fourth parameter being changed from a second starting value to such an end value at which closing or opening of the quantity control valve is just no longer ascertained or is just ascertained, in conjunction with the end value of the first adaptation it is possible to accurately determine the characterizing relationship between the control signal and the closing/opening behavior of the quantity control valve. The method according to the present invention is inexpensive to implement, since no additional costs per unit arise.

In this first and second adaptation, if the first parameter corresponds to the third parameter, and the second parameter corresponds to the fourth parameter, a specific embodiment results in which the same parameter is adapted in the two adaptations. This specific embodiment is particularly easy to implement on a control/regulation unit. In this specific embodiment, if at least the first constant value and the second constant value are not equal, or the first starting value and the second starting value are not equal, the two events are independent, which allows the characteristic relationship between the control signal and the closing/opening behavior of the quantity control valve to be described by two parameters.

In this first and second adaptation, if the first parameter corresponds to the fourth parameter, and the second parameter corresponds to the third parameter, a specific embodiment results in which different parameters are adapted in the two adaptations. This specific embodiment, in conjunction with at least the first constant value and the second starting value not being equal, or the first starting value and the second constant value not being equal, allows the characteristic relationship between the control signal and the closing/opening behavior of the quantity control valve to be described by two parameters. This specific embodiment allows the particularly robust ascertainment of the two parameters which describe the characteristic relationship.

Carrying out the method according to the present invention for pulse width-modulated control signals is possible in a particularly simple manner when one of the parameters belongs to the group composed of the pulse duty factor during a holding phase or an equivalent variable, and duration of a starting pulse or an equivalent variable.

Carrying out the method according to the present invention for electromagnetically controlled quantity control valves is particularly simple when at least one of the parameters belongs to the group composed of the efficiency of the quantity control valve or an equivalent variable, and overall ohmic resistance deviation or an equivalent variable.

If the parameter is ascertained by a measurement or by an estimation, or is read out from the control and regulation unit, in conjunction with the result of a first adaptation the characteristic relationship between the control signal and the closing/opening behavior of the quantity control valve may be described by two parameters. This is particularly efficient, since only one adaptation is necessary for ascertaining the two parameters. If an ohmic resistance of a supply line is used as a parameter, in particular this allows the particularly simple ascertainment of the overall ohmic resistance deviation.

The above-described methods may be used in such a way that, based on the characterizing variables, the parameters of the control signal of the quantity control valve may be changed in such a way that emission of audible sound generated during closing of the solenoid valve is at least partially reduced.

The above-described methods are advantageously implemented using a computer program which is programmed for use in a method according to one of the preceding descriptions.

The method according to the present invention thus allows a particularly good adaptation of the control of the quantity control valve to the specimen properties. One advantage is the reduction of audible sound which is generated during closing of the quantity control valve during operation of the internal combustion engine. Another advantage is that the holding current level may be adapted to the specimen behavior of the valve and to the overall ohmic resistance which is effective for the control signal. For example, the holding current level may be minimized, as the result of which less power loss is dissipated, and development of an unnecessarily high temperature in the quantity control valve is avoided. A further advantage is that better pilot control of the closing times may be achieved during magnetic attraction of the quantity control valve, since the important uncertain parameters are known, which allows the delivery accuracy, for example, to be improved.

Another advantage results for the control of de-energized, open, electromagnetically controllable quantity control valves, in which the acoustic behavior during opening due to a braking pulse applied by the electromagnetic control, which decelerates the motion of the armature, is improved. In this case the braking pulse may be adapted to the specimen properties of the quantity control valve in a particularly suitable way, thus improving the robustness of the desired behavior in cases of tolerance limits.

BRIEF DESCRIPTION OF THE INVENTION

DETAILED DESCRIPTION OF THE INVENTION

Figure 1:
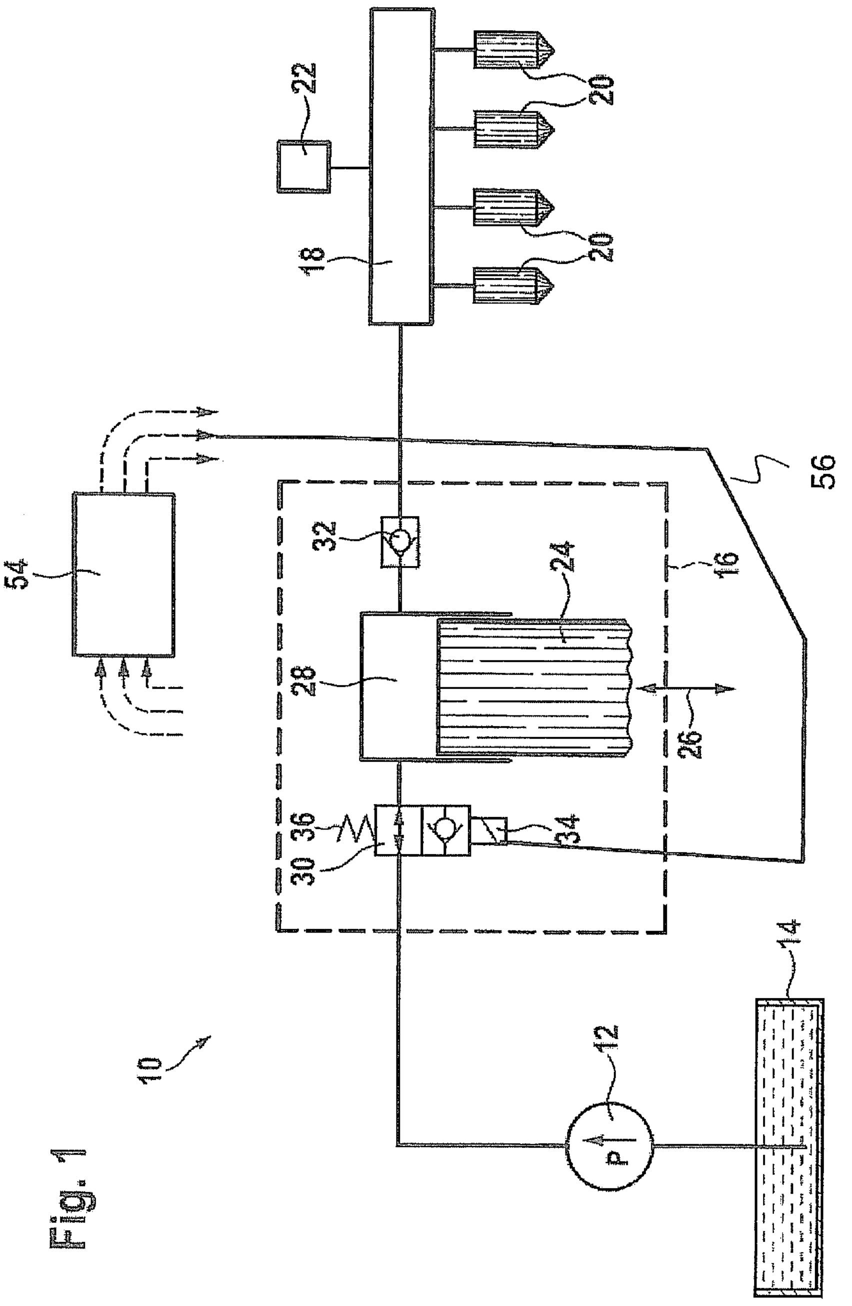
FIG. 1 shows a schematic illustration of a fuel injection system of an internal combustion engine having a high-pressure pump and a quantity control valve.

A fuel injection system is denoted overall by reference numeral 10 in FIG. 1. The fuel injection system includes an electric fuel pump 12 via which fuel is delivered from a fuel tank 14 to a high-pressure pump 16. High-pressure pump 16 compresses the fuel to a very high pressure and delivers it onward into a fuel rail 18. Multiple injectors 20 are connected to the fuel rail which inject the fuel into assigned combustion chambers. The pressure in fuel rail 18 is detected by a pressure sensor 22.

High-pressure pump 16 is, for example, a reciprocating pump having a delivery piston 24 which may be set in a back-and-forth motion (double arrow 26) by a camshaft, not shown. Delivery piston 24 delimits a delivery space 28, which may be connected to the outlet of electric fuel pump 12 via a quantity control valve 30. Delivery space 28 may also be connected to fuel rail 18 via an outlet valve 32.

Quantity control valve 30 includes an electromagnetic actuating device 34 which in the energized state works against the force of a spring 36. Quantity control valve 30 is open in the de-energized state, and in the energized state has the function of a standard inlet check valve. Electromagnetic actuating device 34 may be designed in particular as a solenoid, which is referred to as a coil below.

Electromagnetic actuating device 34 is controlled by a control and regulation device 54, which is connected thereto via a current-conducting line 56.

According to the present invention, it is known that at least two parameters which characterize the quantity control valve are important for suitably controlling the quantity control valve. These parameters are, for example, an efficiency of the quantity control valve and an overall ohmic resistance deviation.

The efficiency of quantity control valve 30 is defined as the ratio of the (quasi-steady state) attractive magnetic force on the armature which is just necessary for the attraction, to the quasi-steady state current in the coil which is effective at this moment. When the factor is normalized so that nominal valves have an efficiency of 1, for example, efficient patterns (rapid magnetic attraction) have an efficiency>1, and inefficient patterns (slow magnetic attraction) have an efficiency<1. The efficiency is determined, for example, by tolerances in the design of the magnetic circuit and of the other dynamic parameters. A further residual air gap results, for example, in a decrease in the efficiency, among other things, since less magnetic flux is built up at constant current, and therefore less attractive magnetic force results. A high elastic force likewise results in a decrease in the attractive magnetic force, and thus, an efficiency<1.

The overall ohmic resistance is composed of multiple serial partial resistances (for example, of the coil of the quantity control valve, lines, transfer resistances, output stage). However, each of these partial resistances is subject to uncertainties concerning the resistance, resulting in certain deviations in a pilot control of quantity control valve 30. Such uncertainties result, for example, from errors in the temperature model of the coil, or from uncertainties in the transfer resistances in the contacts. The overall ohmic resistance deviation results from the difference between the overall ohmic resistance and a nominal overall ohmic resistance.

Figure 2:
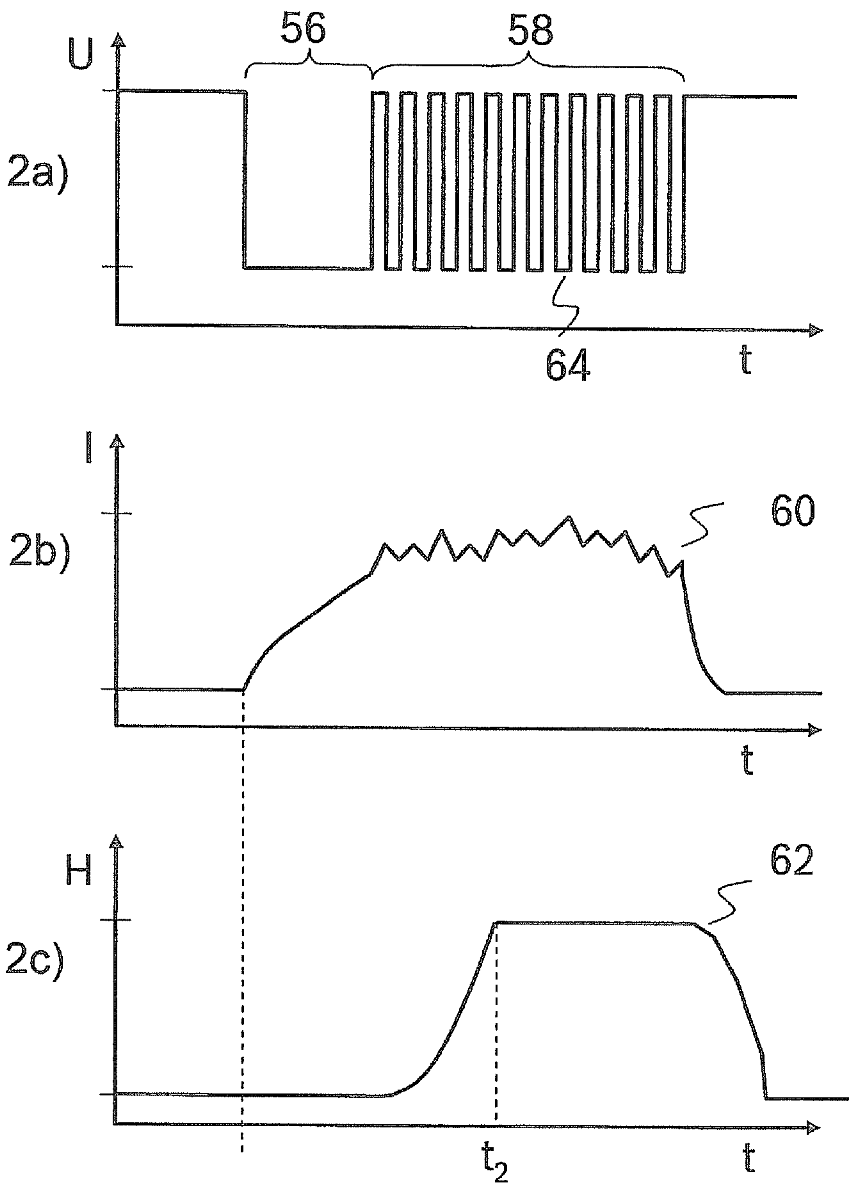
FIG. 2 shows three diagrams in which a control voltage of a solenoid, energizing of a solenoid, and a lift of a valve element of the quantity control valve from FIG. 1 are schematically plotted as a function of time.

The variation of a control voltage U applied to electromagnetic actuating device 34 is plotted over time in the top diagram 2*a* in FIG. 2. It is apparent that in the exemplary embodiment, this control voltage U is clocked in the sense of a pulse width modulation. The middle diagram 2*b* in FIG. 2 shows corresponding coil current I. The bottom diagram 2*c* in FIG. 2 shows corresponding lift H of quantity control valve 30.

It is apparent from FIG. 2 that voltage signal U and coil current I resulting therefrom initially have a so-called "starting pulse" 56. The coil is controlled by a constant voltage during this starting pulse. The starting pulse is used to build up the magnetic force of electromagnetic actuating device 34 as quickly as possible. Accordingly, this results in a rapid increase in the coil current, denoted by reference numeral 60 in FIG. 2. Starting pulse 56 is followed by a holding phase 58 in which the coil is controlled by a clocked voltage 64. Effective control voltage U is defined by the pulse duty factor of the pulse width-modulated voltage signal. Resulting coil current 60 shows a clocking corresponding to the voltage signal, and shows an increase, a largely constant behavior (as illustrated in the exemplary embodiment in FIG. 2), or a drop, depending on the effective control voltage.

It is likewise apparent from FIG. 2 that at lift H of quantity control valve 30, the quantity control valve is initially in its open state, then is set in motion due to the coil current resulting from the starting pulse, and at a point in time $t_2$ closes and strikes against a stop, resulting in an impact noise.

After the end of holding phase 58 of the voltage control of the coil, coil current 60 drops to zero. Lift 62 of the quantity control valve changes in such a way that the valve goes from its closed state to its open state.

According to the present invention, it is recognized that a signal for controlling quantity control valve 30 is advantageously defined by at least two parameters. In the case of a pulse width-modulated control during closing of quantity control valve 30, these parameters are, for example, the pulse duty factor during holding phase 58 and the duration of starting pulse 56. Within the scope of the exemplary embodiment, a pulse width-modulated control is assumed below, whose signal is defined by the following two parameters: pulse duty factor during the holding phase, and duration of the starting pulse.

In the adaptation process known from the related art, one parameter of the control of quantity control valve 30 (for example, the duration of the starting pulse) is successively varied while the other parameters (for example, the pulse duty factor during the holding phase) are simultaneously held constant, until it is determined that the quantity control valve does just no longer close, or just closes. The resulting value of the successively varied parameter now allows detection only of an averaged parameter which represents the overlapping influence of the characterizing parameters, i.e., the efficiency and the overall ohmic resistance deviation, for example. Thus, essentially two extreme cases are identifiable in which the characterizing parameters influence the properties of the quantity control valve in the same way. For example, this is the case, firstly, for low efficiency and positive overall ohmic resistance deviation, and secondly, for high efficiency and negative overall ohmic resistance deviation.

However, in this example, in particular the three cases of firstly, low efficiency and negative overall ohmic resistance deviation, secondly, high efficiency and positive overall ohmic resistance deviation, and thirdly, nominal efficiency and vanishing overall ohmic resistance deviation, are indistinguishable from the adaptation process known from the related art.

The method according to the present invention allows the independent ascertainment of both characterizing parameters, i.e., efficiency and overall ohmic resistance deviation, for example.

The method according to the present invention is based on the finding that it is not possible to use a single measured variable (for example the result of an adaptation) for the simultaneous reliable estimation of two independent unknown parameters (in the exemplary embodiment, the efficiency and the overall ohmic resistance deviation). However, if a second adaptation is carried out according to the present invention which takes place with a changed base parameterization, for example, two parameters (in the exemplary embodiment, the efficiency and the overall ohmic resistance deviation) may be ascertained from the result of the first adaptation and the result of the second adaptation. Within the scope of the exemplary embodiment, it is assumed below that the two parameters which characterize the behavior of quantity control valve 30 are specified by the efficiency and the overall ohmic resistance deviation. Alternatively or additionally, other variables may be used as parameters, for example a variable which is equivalent to the efficiency or to the overall ohmic resistance deviation.

Figure 3:
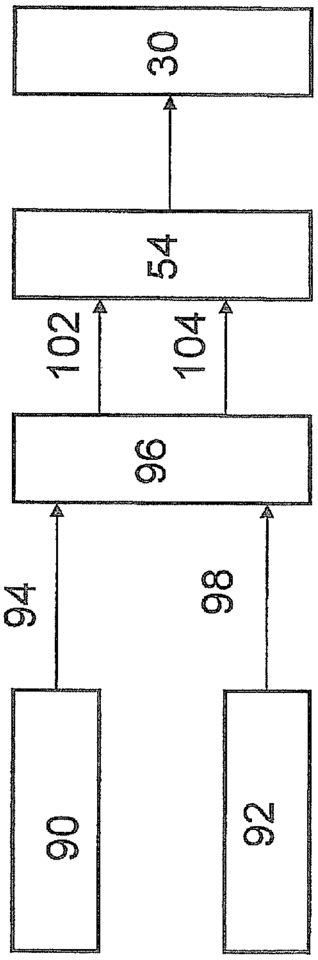
FIG. 3 shows a schematic sequence diagram of one specific embodiment of the method according to the present invention.

FIG. 3 shows the sequence of the method according to the present invention. In a first adaptation 90, the closing behavior of quantity control valve 30 is varied by varying a parameter, for example the duration of starting pulse 56. Result 94 of this first adaptation 90 is the value of the varied parameter at which quantity control valve 30 does just no longer close, or just closes.

In a second adaptation 92, the closing behavior of quantity control valve 30 is varied by varying a parameter, for example the duration of starting pulse 56. Result 98 of this second adaptation is the value of the varied parameter at which quantity control valve 30 does just no longer close, or just closes.

Based on result 94 of first adaptation 90 and result 98 of second adaptation 92, a first parameter 102, for example the efficiency, and optionally a second parameter 104, for example the overall ohmic resistance deviation, are ascertained with the aid of a computation 96, for example a computation or a characteristic map. This first parameter 102 and this optional second parameter 104 are used in control and regulation device 54 to provide improved control of quantity control valve 30, in particular with regard to the acoustic behavior, for example with the aid of a characteristic map.

In adaptation 90, for example the duration of starting pulse 56 is successively varied while the pulse duty factor is simultaneously held constant during holding phase 58, until it is determined that quantity control valve 30 does just no longer close, or just closes. This is carried out, for example, by evaluating the measuring signal of pressure sensor 22. In the present exemplary embodiment, result 94 is the value of the duration of the starting pulse at which quantity control valve 30 does just no longer close, or just closes.

Similarly, in adaptation 92, for example the pulse duty factor during holding phase 58 is successively varied while the duration of starting pulse 56 is simultaneously held constant until it is determined that the quantity control valve does just no longer close, or just closes. In the present exemplary embodiment, result 98 is the value of the pulse duty factor at which quantity control valve 30 does just no longer close, or just closes.

Figure 4:
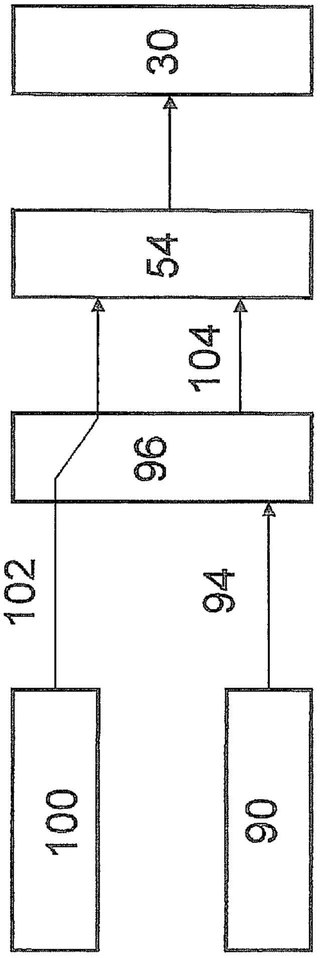
FIG. 4 shows a schematic sequence diagram of a specific embodiment of the method according to the present invention which is different from the embodiment illustrated in FIG. 3.

An alternative specific embodiment is illustrated in FIG. 4. In a first adaptation 90, the closing behavior of quantity control valve 30 is varied by varying a parameter, for example the duration of starting pulse 56. Result 94 of this first adaptation 90 is the value of the varied parameter at which quantity control valve 30 does just no longer close, or just closes.

A first parameter 102 is provided via a specification 100, for example as the result of a measurement. A second parameter 104 is ascertained based on the result of first adaptation 90 and first parameter 102.

This first parameter 102 and this second parameter 104 are used in control and regulation device 54 to provide improved control of quantity control valve 30, in particular with regard to the acoustic behavior, for example with the aid of a characteristic map.

Specification 100 may be provided, for example, by a measurement of the overall ohmic resistance deviation. According to the present invention, this is carried out in a particularly advantageous way by evaluating a current value of the control signal at a predefined voltage and a predefined pulse duty factor. It is then particularly easy to ascertain the overall ohmic resistance deviation. For the pulse width-modulated control used in the exemplary embodiment, the effective current is particularly advantageously evaluated according to the present invention over multiple phases of the pulse width-modulated control signal in the steady state at saturated current, i.e., at a flat lift variation 62. The evaluation over multiple phases of the pulse width-modulated control signal allows the particularly simple ascertainment of an effective current for ascertaining the overall ohmic resistance deviation. Determining the current in the steady state at saturated current and without movement of an armature of the quantity control valve allows feedback effects to be eliminated, and thus allows the overall ohmic resistance deviation to be ascertained in a particularly accurate manner.

The efficiency as the second parameter is then ascertained based on the measurement of the overall ohmic resistance deviation and the result of the first adaptation.

Figure 5:
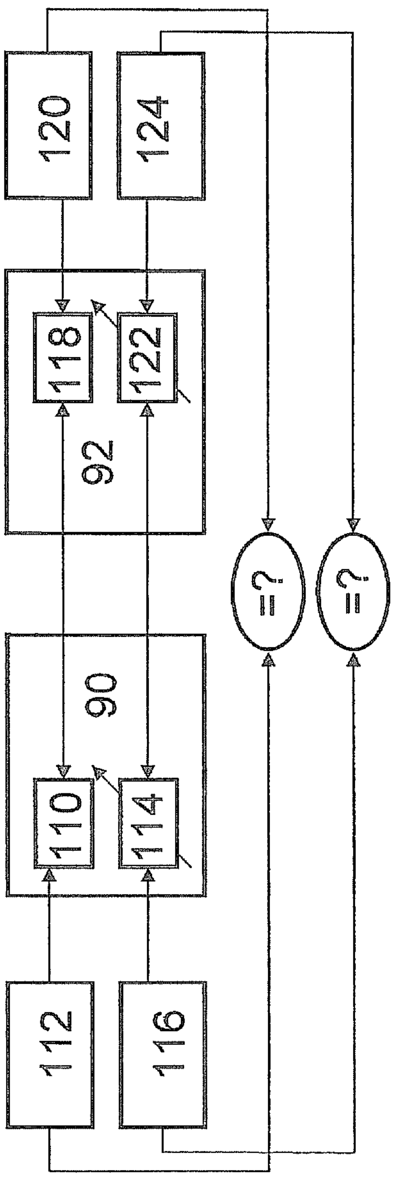
FIG. 5 shows a schematic illustration of the relationship of the two adaptations and of the parameters which are varied and held at a constant value, for the case that the same parameter is varied in the two adaptations.

FIG. 5 describes the relationship of first adaptation 90 and second adaptation 92 to one another. In first adaptation process 90, a first parameter 110, for example the pulse duty factor during holding phase 58, is held at a first constant value 112, and a second parameter 114, for example the duration of starting pulse 56, is changed from a first starting value 116 to such an end value at which closing or opening of quantity control valve 30 is no longer ascertained or is just ascertained.

In second adaptation process 92, a third parameter 118, for example the pulse duty factor during holding phase 58, is held at a second constant value 120, and a fourth parameter 122, for example the duration of starting pulse 56, is changed from a second starting value 124 to such an end value at which closing or opening of quantity control valve 30 is just no longer ascertained or is just ascertained.

Thus, in the exemplary embodiment illustrated in FIG. 5, for example first parameter 110 and third parameter 118 both correspond to the pulse duty factor during holding phase 58, and second parameter 114 and fourth parameter 122 both correspond to the duration of starting pulse 56. Therefore, first parameter 110 corresponds to third parameter 118, and second parameter 114 corresponds to fourth parameter 122.

Figure 6:
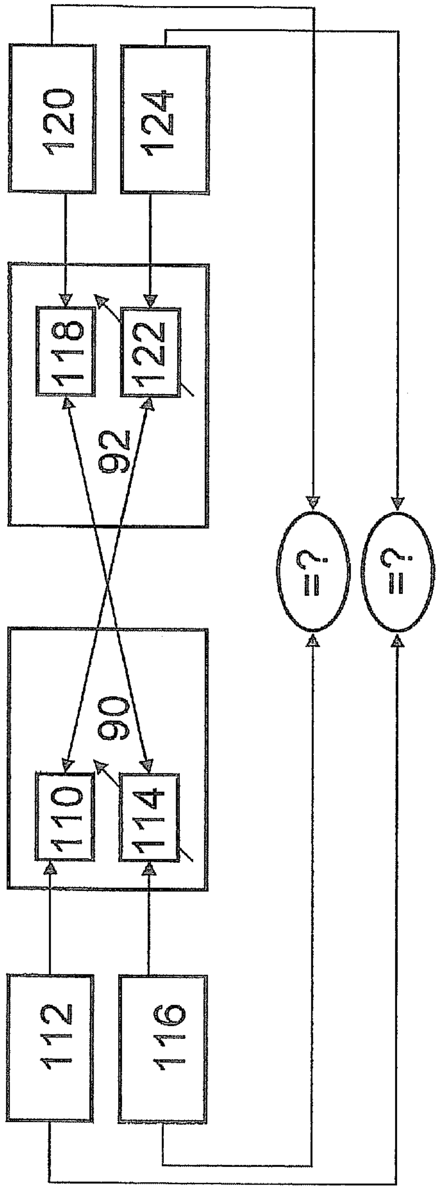
FIG. 6 shows, similarly to FIG. 5, a different configuration of the parameters which are varied and held at a constant value, for the case that the same parameter is not varied in the two adaptations.

Similarly to FIG. 5, FIG. 6 illustrates another possible specific embodiment. For example, in first adaptation 90 the pulse duty factor is held at a second constant value 120 during holding phase 58 and the duration of starting pulse 56 is changed, and in second adaptation 92 the duration of starting pulse 56 is held at a first constant value 110 and the pulse duty factor during the holding phase is changed. Thus, for example, first parameter 110 and fourth parameter 122 both correspond to the duration of starting pulse 56, and second parameter 114 and third parameter 118 both correspond to the pulse duty factor during holding phase 58. Therefore, first parameter 110 corresponds to fourth parameter 122, and second parameter 114 corresponds to third parameter 118.

In order for first adaptation 90 to be independent from second adaptation 92, it is important that the starting parameterizations, composed of a constant value and a starting value in each case, are different. In the configuration illustrated in FIG. 5, this means either that first constant value 112 is different from second constant value 120, or first starting value 116 is different from second starting value 124, or both.

In the configuration illustrated in FIG. 6, this means either that first constant value 112 must be different from second starting value 124, or first starting value 116 must be different from second constant value 120, or both.

The method according to the present invention for identifying at least two parameters is advantageously repeated at long intervals. This is due to the fact that the parameters, for example the efficiency, change slowly over time, for example on account of wear. Since this change is slow, it is advantageous to store the ascertained parameters in the control and regulation unit, for example.

If characteristic maps are used in the described method, it is advantageous to adapt these characteristic maps to the instantaneous battery voltage, since the currents in the control of the quantity control valve, and possibly the result of an adaptation (in particular when the adapted parameter is specified by the pulse duty factor), may be a function of the battery voltage.

If the overall ohmic resistance deviation is provided in the described method by a measurement, it is advantageous to repeat this measurement at short intervals, since the resistance changes based on the situation.

In addition, it is advantageous to carry out three or more independent adaptations, since the accuracy of the ascertained parameters may be further improved in this way. An algorithm for minimizing a defined deviation, which is stored, for example, with corresponding characteristic maps in the control and regulation unit, may be necessary.

What is claimed is:

1. A method for controlling a quantity control valve, comprising:

ascertaining at least two control parameters characterizing the quantity control valve, wherein a first control parameter is a variable representing the efficiency of the quantity control valve, and a second control parameter is a variable representing an overall ohmic resistance deviation; and generating a control signal supplied to the quantity control valve, wherein the control signal is defined by the at least two control parameters;

wherein one of (i) the first control parameter and the second control parameter are ascertained based on the results of a first adaptation using at least one adaptation parameter and a second adaptation using at least one other adaptation parameter, or (ii) the second control parameter is ascertained based on the result of the first adaptation and the first control parameter.

2. The method as recited in claim 1, wherein in the first adaptation, a first adaptation parameter is held at a first constant value, and a second adaptation parameter is changed from a first starting value to an end value at which one of closing or opening of the quantity control valve one of first ceases to be ascertained or is first ascertained.

3. The method as recited in claim 2, wherein in the second adaptation, a third adaptation parameter is held at a second constant value, and a fourth adaptation parameter is changed from a second starting value to an end value at which one of closing or opening of the quantity control valve one of first ceases to be ascertained or is first ascertained.

4. The method as recited in claim 3, wherein the first adaptation parameter corresponds to the third adaptation parameter, and the second adaptation parameter corresponds to the fourth adaptation parameter.

5. The method as recited in claim 3, wherein the first adaptation parameter corresponds to the fourth adaptation parameter, and the second adaptation parameter corresponds to the third adaptation parameter.

6. The method as recited in claim 4, wherein at least one of:
(i) the first constant value and the second constant value are not equal; and
(ii) the first starting value and the second starting value are not equal.

7. The method as recited in claim 5, wherein at least one of:
(i) the first constant value and the second starting value are not equal; and
(ii) the first starting value and the second constant value are not equal.

8. The method as recited in claim 3, wherein at least one of the first through fourth adaptation parameters is one of: (i) a pulse duty factor during a holding phase; or (ii) a duration of a starting pulse.

9. The method as recited in claim 2, wherein the first control parameter is one of: ascertained by measurement; estimated; or read out from a control unit.

10. The method as recited in claim 9, wherein a resistance of a supply line is used as the first control parameter.

11. The method as recited in claim 10, wherein the resistance of the supply line is ascertained by evaluating a current value of the control signal at a predefined voltage and a predefined pulse duty factor.

12. A non-transitory computer-readable data storage medium storing a computer program having program codes which, when executed on a computer, performs a method for controlling a quantity control valve, the method comprising:
ascertaining at least two control parameters characterizing the quantity control valve, wherein a first control parameter is a variable representing the efficiency of the quantity control valve, and a second control parameter is a variable representing an overall ohmic resistance deviation; and
generating a control signal supplied to the quantity control valve, wherein the control signal is defined by the at least two control parameters;
wherein one of (i) the first control parameter and the second control parameter are ascertained based on the results of a first adaptation using at least one adaptation parameter and a second adaptation using at least one other adaptation parameter, or (ii) the second control parameter is ascertained based on the result of the first adaptation and the first control parameter.

13. A control device for a fuel injection system, comprising:
means for ascertaining at least two control parameters characterizing the quantity control valve, wherein a first control parameter is a variable representing the efficiency of the quantity control valve, and a second control parameter is a variable representing an overall ohmic resistance deviation; and
means for generating a control signal supplied to the quantity control valve, wherein the control signal is defined by the at least two control parameters;
wherein one of (i) the first control parameter and the second control parameter are ascertained based on the results of a first adaptation using at least one adaptation parameter and a second adaptation using at least one other adaptation parameter, or (ii) the second control parameter is ascertained based on the result of the first adaptation and the first control parameter.

* * * * *